Jan. 6, 1970  R. W. GRÄFF  3,487,608
METHOD AND APPARATUS FOR ADSORPTION OF MOLECULES FROM FLUIDS
Filed March 9, 1967  6 Sheets-Sheet 1

INVENTOR
RODERICH W. GRÄFF
BY Mentlew and Toren
ATTORNEYS

Jan. 6, 1970  R. W. GRÄFF  3,487,608
METHOD AND APPARATUS FOR ADSORPTION OF MOLECULES FROM FLUIDS
Filed March 9, 1967  6 Sheets-Sheet 5

Inventor
RODERICH W. GRÄFF
BY McGlew and Toren
ATTORNEYS

Fig.10

United States Patent Office 3,487,608
Patented Jan. 6, 1970

3,487,608
METHOD AND APPARATUS FOR ADSORPTION
OF MOLECULES FROM FLUIDS
Roderich W. Gräff, Kollwitzweg 19,
Darmstadt-Arheilgen, Germany
Filed Mar. 9, 1967, Ser. No. 621,935
Claims priority, application Germany, Mar. 11, 1966,
G 46,282
Int. Cl. B01d 53/26, 53/02
U.S. Cl. 55—33                    11 Claims

ABSTRACT OF THE DISCLOSURE

A method for the selective adsorption of molecules from gases or liquids, particularly of water vapor from gases, preferably air, in chambers which are filled with adsorbents, is disclosed herein in respect to several embodiments of apparatus for carrying out the method. In accordance with the method of the invention, at least one of the adsorption chambers is traversed by the medium to be treated while at least one other chamber is regenerated by the same or some other medium which is heated and circulated therethrough.

---

Several embodiments of apparatus for carrying out the method are disclosed which include at least two adsorption chambers which are cyclically connected and disconnected to the medium to be treated and to a heated regenerating medium by means which effect the slow connection and slow cut-off of the flow of the medium.

In accordance with one embodiment of the invention, the apparatus for carrying out the method includes at least two regenerative vessels defining chambers which are mounted so that they may be moved, e.g. rotated, relatively to means for directing a medium to be treated into the vessel for a selected period of time while the other chamber is connected to a medium which has been heated and regenerated. The apparatus advantageously includes means for rotating the chambers which are advantageously disposed between connecting line portions from the medium to be treated and from the regenerated medium and which includes a gradually openable connection for slowly increasing and thereafter slowly decreasing the flow of the associated medium during each stage of the adsorption and regenerating process. The apparatus advantageously includes a shaft for rotatably supporting the two chambers on opposite sides of disk members and plate valves having openings which are arranged to communicate with the fixed conduits for circulating the medium to be treated and the regenerated and reheated medium.

In accordance with a modified version at least three separate vessels defining chambers are disposed for relative rotation in respect to plate valve members which have means effective by the relative rotation for selectively connecting and disconnecting the chambers cyclically to the fluid medium to be treated and to the regenerated and reheated fluid medium.

A still further embodiment includes means for supporting a rotatable disk with at least two regenerative chambers thereon in a position so that they may be rotated past connections for supplying the fluid to be treated and the reheated regeneration fluid. A modification of this arrangement includes at least four separate vessels defining adsorption chambers.

A still further modification provides a fixed mounting for the regenerative vessels and means for mounting a rotary valve so that the connections to the vessels may be selectively and cyclically made in respect to the fluid to be treated and the regeneration fluid. The valve means for connecting the vessels for regenerative cycle operation and for treatment cycle operation may also comprise a rotatable shaft controlled valve system.

SUMMARY OF THE INVENTION

This invention relates in general to a method and apparatus for treating fluid and particularly to a new and useful method and apparatus for the selective adsorption of molecules from gases or liquids, particularly for the adsorption of water vapor from gases such as air.

Air is usually dried by conducting it through a vessel which is filled with an adsorbent such as a silica gel or a molecular sieve, for example. The air flows around the adsorbent and gives off its humidity. As soon as the adsorbent is enriched with a certain percentage of water, it must be regenerated. The simplest way to do this is to conduct air at a high temperature, for example at a temperature above 250° C., through the vessel.

The known apparatus for the continuous drying of air includes two chambers which are filled with drying agents and an air circulating system which is equipped with a blower. The construction is such that when one chamber is employed for drying the air which is subsequently heated in a heater to the necessary temperature, the drying agent is regenerated in the second chamber. The switching from one drying chamber to the other is effected automatically and in rhythm. This type of apparatus and method of operating is referred to as a Whitlock system. In this arrangement the regenerating air is branched off from the cycle, heated, and directed through the regenerating chamber and then blown off into the atmosphere. With another method the regenerating air is taken from the atmosphere, heated, conducted through the chamber, and again blown off into the atmosphere. This latter method methods has disadvantages inasmuch as the adsorbent material cannot be utilized to its full capacity. This is due to the fact that the air must cover a certain path through is referred to as "Una-Dyn" system. Each of the above the adsorbent material in dependence on the velocity of the air in order to give off its humidity. Because of the high velocity of the flow throughout the chambers, the adsorbent will only be utilized in a partial area or zone of the adsorbent and not uniformly throughout the adsorbent.

A further disadvantage of the prior art methods and apparatus is that the heated regenerating air is poorly utilized. In the dryers of the known type, the entire humid regenerating air is blown into the surrounding air. It has been found, particularly at high velocities of the regenerating air, that the issuing hot regenerating air could adsorb substantially more moisture. A further disadvantage is that the adsorbent must be cooled after regeneration, since it can only adsorb water vapor at low temperatures. To this end cool outside air is blown through the regeneration chamber just regenerated but any water vapor present in the outside air is adsorbed in the adsorbent during this process so that the ultimate adsorption capacity of the just regenerated chamber is reduced.

A disadvantage in all the known apparatus which is employed is that they are switched by valves which must be controlled by timed relays and this results in very high installation expense and operating expense.

In accordance with the present invention, the selective adsorption of molecules from gases or liquid is carried out in at least two separate adsorbent chambers filled with adsorbent material which are connected to means for circulating the medium to be treated and the regenerative medium in a manner so that one of the chambers is connected to the medium to be treated while the other is conected to the regenerative medium which may be the same or another medium which is heated or regenenrated. A feature of the construction is that the connection is accomplished automatically by relative rotation between the adsorbent chambers and the connecting conduits for the medium to be treated and the heated and regenerated medium. In addition, the arrangement is such and the connections are such that the inflow and outflow of the mediums may be accomplished gradually. A particular advantage of this arrangement is the gradual increase of flow both into and decrease of flow out of the adsorbent chambers which insures that the entire areas of adsorbent materials may be effectively utilized.

In accordance with the method of the invention, the medium to be treated is directed into the adsorption chamber so that toward the end of the treating cycle there will be a slowly decreasing velocity of flow. Furthermore the medium to be treated is directed into a just regenerated chamber with a slowly increasing velocity of flow. In this manner the heat expended for regeneration is recovered in the main cycle without an excessive increase of temperature. In addition, no time is lost for an interposed cooling cycle.

In the application of the invention to drying air, the air to be treated is moved in a first cycle through an adsorption chamber and regenerating air is moved in a second closed cycle through means for heating the air prior to its entry into the second chamber and thereafter through the second chamber for regenerating the adsorbent material in this chamber. Outside air is advantageously supplied as a refreshed regenerating medium in predetermined percentages to the recirculated regeneration medium. This has the advantage that it permits the use of the regenerating air in several steps up to the limit of its saturation capacity.

The invention of the present case also provides a novel and simple apparatus construction which includes the mounting of adsorption vessels in respect to interconnecting piping or treatment medium movement means and regeneration medium movement means so that the vessels and the piping may be rotated relatively to permit the selective connection and disconnection of the chambers to the flow of the medium to be treated and to the heated medium for regeneration. The construction is such that the parts perform a relative rotary movement and the chambers are arranged symmetrically to the axis of rotation so that they may be periodically connected and disconnected to the various flow channels. In accordance with the various embodiments, the adsorbent chambers may be mounted between rotary disk members for rotation with the disk members so that they will be cyclically connected and disconnected to connecting lines which are directed to openings in the disk which communicate with the chambers upon rotation, with the treatment medium being separately conducted apart from the regenerative medium. The apparatus of the invention may take various forms and include two or more adsorbent chamber devices and the adsorbent material chambers may be rotated or may be fixed.

In the construction in which the adsorbent material chambers are fixed, a rotary pipe element is arranged for periodically connecting the chambers for regenerative air flow and for treatment medium air flow therethrough. The apparatus advantageously includes control disks having slots forming slide valve openings for distributing and controlling the medium flow during each cycle. The slots are advantageously formed as circular ring segments having varying widths to provide for the desirable change of flow conditions.

Accordingly, it is an object of the present invention to provide an improved method for the selective adsorption of molecules from gases or liquids, particularly of water vapor from a gas such as air, using at least two chambers filled with adsorbent materials which comprises directing the medium to be treated through at least one of the chambers and substantially at the same time directing a separately conducted heated medium through the other chamber for regenerating the chamber and where the connecting and disconnecting of each chamber to the respective medium is done in a manner to provide gradual increase and decrease of flow.

A further object of the invention is to provide an apparatus for the selective adsorption of molecules from gases or liquid, particularly of water vapor from air, which includes at least two vessels defining adsorbent material chambers arranged adjacent first means for the flow or movement of the medium to be treated and second means for the flow of a regenerative medium, with valve means effective upon moving said vessels and said conduit means relatively for cylically connecting and disconnecting said vessels to the respective conduit means.

A further object of the invention is to provide an apparatus for the adsorption of water vapor from air which includes valve control means associated with a plurality of vessel-defining adsorption chambers to provide a regulated inflow and outflow of fluid to be treated and regenerative treatment fluid in cyclic flow patterns, the arrangement being such that the vessels may be rotated adjacent fixed connecting lines for the medium flow or the vessels mounted in a fixed fashion and connected to the flow channels for the mediums by rotatable connecting conduits.

A further object of the invention is to provide an adsorption apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION

Figures 1, 1A:
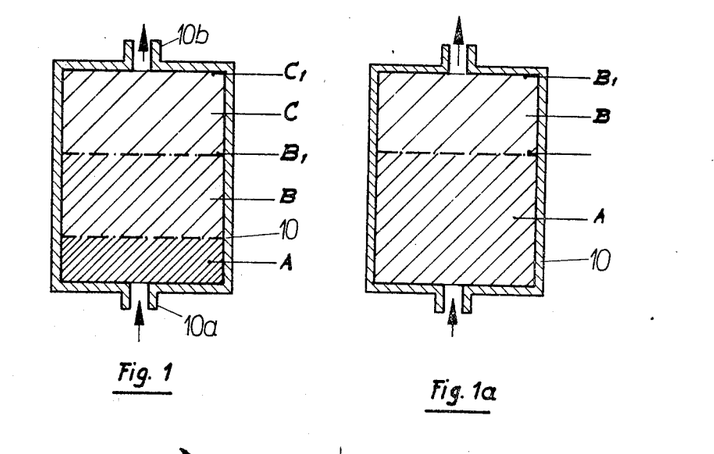
FIGS. 1 and 1a are schematic representations of a drying chamber indicating variations of zone utilization in dependence on medium flow.

Referring to the drawings in particular, in FIGS. 1 and 1a the vessel 10 having adsorption material therein is shown in respect to the utilization of the adsorption material throughout the cross section. In FIG. 1 a vessel 10 filled with adsorbent which has been admitted for some time with humid air will have a zone A which will have already absorbed the maximum amount of water vapor. In the next zone designated B proceedings from the inlet 10a to the outlet 10b, the water content of the adsorbent will diminish from the maximum value to the minimum value left in the regeneration of the adsorbent. In the top zone C the adsorbent will contain only the amount of water which is left in the regeneration. The length of the transition zone B will depend directly on the velocity of the air passing through the vessel. The drying chamber 10 thus can be admitted with humid air so long as the upper end of the transition zone (B1) ends at the uppermost position of the absorbent, namely at the surface designated C1. This condition is illustrated in FIG. 1a. If the chamber is admitted with additional humid air, the dried air current would no longer have the optimum low dew point but would show slowly rising water vapor content. Since this is inadmissible, the adsorbent will only be fully utilized in the zone A and only partly in the zone B.

In accordance with the invention substantially the complete adsorption chamber is optimally employed by cyclically and gradually directing the medium to be treated into one of a plurality of chambers while one or more of the others are being traversed by a heated medium and in a manner such that the velocity of flow is controlled by gradually increasing the flow area of the connection to and from the respective chambers so that they are slowly connected and disconnected at the start and at the end of their adsorption cycle. In this manner the adsorbent is better utilized because the transition zone B becomes smaller. In arrangements of the invention in which more than two regenerating chambers are employed, only one chamber is preferably regenerated while the others are connected into the absorption cycle.

A further feature of the method of the invention is that the medium to be treated traverses the adsorption chamber toward the end of the cycle with a slowly decreasing velocity. At the same time, the hot regenerated chamber is connected slowly toward the end of the regenerating cycle to the adsorption cycle. In this manner, the heat expended for regeneration is recovered in the main cycle without increasing the temperature excessively. In addition, no time is lost for an interposed cycle. Because the absorbent material cools off rapidly and contributes in an increased manner to the adsorption process, the through-put of a device constructed in accordance with the invention is vastly increased.

Figure 2:
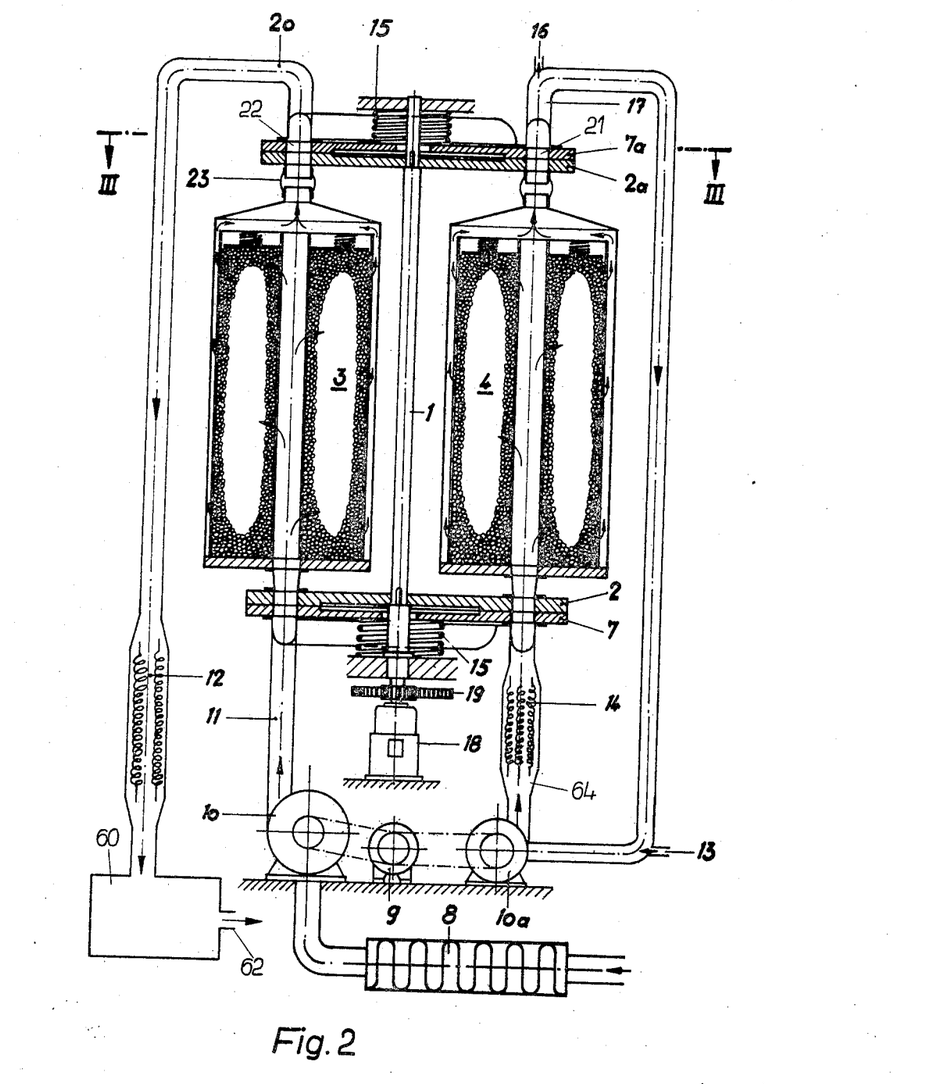
FIG. 2 is a somewhat schematic partial elevational and transverse sectional view of an apparatus for the selective adsorption of molecules from gases or liquids constructed in accordance with the invention.
Figure 3:
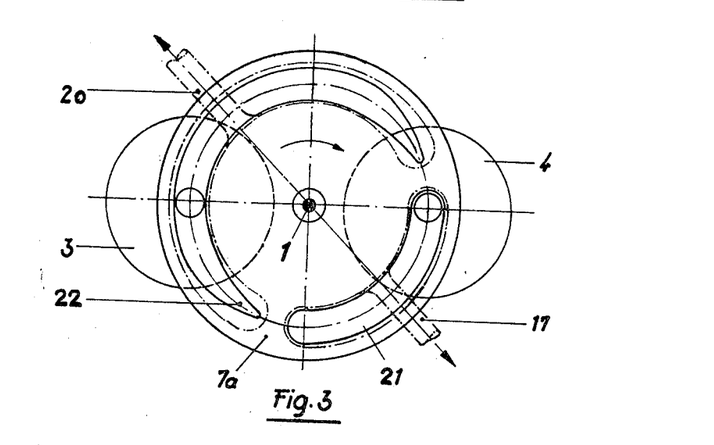
FIG. 3 is a section taken on the line 3—3 of FIG. 2.

Referring to the embodiment of FIGS. 2 and 3, the adsorption apparatus comprises an air dryer which includes a central rotatable shaft 1 which carries at spaced locations perforated disks 2 and 2a between which are located drying tanks or adsorbent vessels generally designated 3 and 4. The upper end of each regenerating chamber 3 and 4 is connected through an expansion sleeve 23 through openings 21a and 22a of the disks 2 and 2a and through specially contoured arcuate slot openings 21 and 22 of valve means comprising fixed plates 7 and 7a and then to conduit means for discharging the medium to be treated and the medium to be used for regeneration, respectively. The disk 2a which is affixed to the shaft 1 for rotation therewith is connected with the chambers 3 and 4 through respective expansion sleeves 23, which permit expansion of the heating and cooling chambers. The apparatus includes springs 15 and 15' for biasing the cam plates 7 and 7a against the associated disks 2 and 2a, respectively.

In accordance with this embodiment of the invention indicated in FIGS. 2 and 3, the conduit means for supplying and receiving the medium or air to be treated and the conduit means for circulating heated air for regenerating the adsorbent materials through the chambers 3 and 4 are mounted in a stationary manner and include the respective fixed plates 7 and 7a and the associated piping to and from these plates. In the embodiment illustrated, the conduit means includes a fan 10 for circulating the fluid medium to be treated through a conduit 11 which is connected to the cam plate 7. A conduit 20 receives the medium which has been treated in one or the other of the chambers 3 or 4 and it is provided with a heater 12 for heating the medium. In the heater 12 the dried air or other medium assumes the temperature necessary for its application. If air is employed, a drying hopper 60 is disposed at the end of the conduit 20 after the heater 12 and it is filled with a material such as plastic granulates which are traversed by the warm medium or air. After passing through the granulates, the air is directed through an outlet 62 which is adapted to be connected to the inlet end of a filter 8 provided for feeding the fluid to be treated back to the suction of the fan 10.

The conduit means for circulating the heated medium for regenerating the chambers includes a fan 10a for discharging the treatment medium through a conduit 64, having a heater 14, which is connected at its discharge end to the fixed plate 7. The heated air which passes through one or the other of the chambers 3 or 4 depending on which one is connected to the regenerative fluid conduit means will pass through the chamber and exit through the expansion fitting 23 and the openings 21 into a receiving conduit 17 which connects back to the suction of the fan 10a. The receiving conduit 17 includes an opening 16 to permit passage of a portion of the regenerating medium or air to a surrounding chamber (not shown) while a major portion, about 50 to 80%, is returned to the blower 10a for recirculation through the chambers for regeneration purposes. Only about 20 to 50% will be permitted to issue through the opening 16 into the surrounding chamber in which the apparatus may be mounted. The escaping portion is replenished automatically through a lower opening 13 which connects to the conduit 17 adjacent the suction of the fan 10a. This automatic return of a part of the regenerated air results in a reduction of the power necessary for supplying heat through the heater 14 and in addition permits higher efficiency in a temperature-dependent adsorption capacity of the air for the water vapor.

In accordance with a feature of the invention, the air which is to be treated and the air which is to be used for regenerative purposes are connected for flow through the respective chambers 3 and 4 in a cyclical manner and under gradually changing velocity conditions in respect to both intake and discharge through the respective chambers. This is accomplished by rotation of the shaft 1 by means of the motor 18 driving through a transmission 19 to cause rotation of the chambers 3 and 4 with the disks 2 and 2a to cause the periodic connection of each chamber 3 and 4 to the means for circulating the medium to be treated and to the means for circulating a regenerative medium during each rotative cycle. As can be seen in FIG. 3, the slots 21 and 22 provide for periods of communication with the regenerative fluid circulating means and the treatment medium circulating means, respectively, during each revolution. The slot 21 which connects the chamber which is oriented thereabove (the chamber 4 in FIG. 3) with the means for recirculating the regenerative fluid is made smaller than the slot 22 for connecting the chambers with the means for circulating the treatment fluid therethrough in order that the treatment cycle time be longer than the regenerative cycle time.

Depending on the adsorbent used, the air for regenerating the adsorbent material in the chambers 3 and 4 is heated by the heater 14 under the control of a thermostat (not shown) to a sufficiently high temperature, for example between 250 to 300° C., in order to drive out the water vapor from the adsorbent material in the adsorbent material chamber 4. After passing through the adsorbent, the regenerating air is passed back through the conduit 17 to the blower 10a and a minor portion is discharged through the opening 16 with the loss being compensated by inflow through the opening 13. The rotation of the shaft 1 together with the perforated plates 2 and 2a and the associated chambers 3 and 4 is relatively slow in the direction of the arrow indicated in FIG. 3. In the represented position of FIG. 3 chamber 4 is just fully connected to line 17 for the discharge of the treatment fluid back to the recirculating line. At this moment a portion of the rotating disk 2a is arranged to contact a switch (not shown) for connecting the motor 9 to drive the blower 10a. At the same time the heater 14 is connected and heats the regenerating air to the regenerating temperature. The duration of the regenerating cycle is determined by the speed of rotation of the chambers 3 and 4 with the shaft 1 and the length of the control slot 21 for the regenerative cycle. As soon as the chamber 4 has arrived at the end of the control slot 21, the blower 10a is disconnected by means of a switch (not shown) contacted by the disk 2 or 2a. Shortly thereafter, the chamber 4 reaches the start of the gradually widening control slot 22 for initiating the inflow of the medium to be treated into the chamber 4. At the first moment of connection only a small air flow will flow into the chamber 4 and the bulk of the air will continue to flow through the chamber 3 which has not been fully disconnected as yet. The small amount of air which initially flows into the chamber 4 begins to cool the adsorbent material slowly.

As soon as the first layers of the adsorbent are cooled off, they can start to adsorb hydrogen. A relatively small amount of air is heated in the chamber 4 to a relatively high temperature but it is mixed on the outlet side with the total amount of air from chamber 3 so that a slightly higher mixing temperature is obtained. At the moment when the connection for the chamber 3 has arrived at the end of the slot 22, the chamber 4 connection reaches the widened portion of the slot 22 so that it becomes fully admitted with the medium to be treated. The slow disconnection of the chamber 3 by the slot 22 has the effect that the air velocity in the adsorbent diminishes continually. The length of the transition zone B according to FIG. 1 is thus shortened so that the fully utilized zone A can be correspondingly larger. In this manner the adsorbent material is better utilized.

Figure 4:
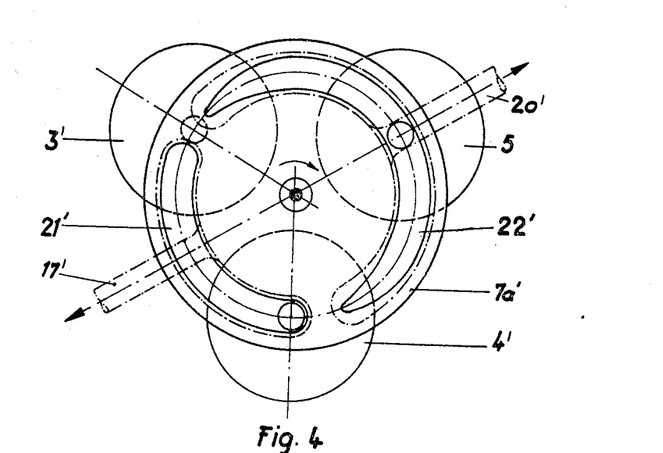
FIG. 4 is a sectional view similar to FIG. 3 of another embodiment of the invention.

The slots defined in the plate 7 may correspond to those defined in the plate 7a or they may be simply formed without the gradually widened and narrowing section at each end. In the embodiment indicated in FIG. 4, the apparatus is the same as in FIGS. 2 and 3 with the exception that there is an additional vessel 5 having adsorbent material. The interior chambers of the vessels 3', 4' and 5 are connected through control slots 21' and 22' to regenerative fluid circulating means 17' and treatment fluid circulating means 20', respectively. In this embodiment the control slot 21' for the regenerative air or medium extends over an angle of approximately 120° of the plate cam 7a. With such a construction the blower for the recirculating air can be run continuously. The construction is such that as soon as one chamber has finished the regenerative cycle, another chamber will be connected to the regenerative medium circulating means.

Figure 5:
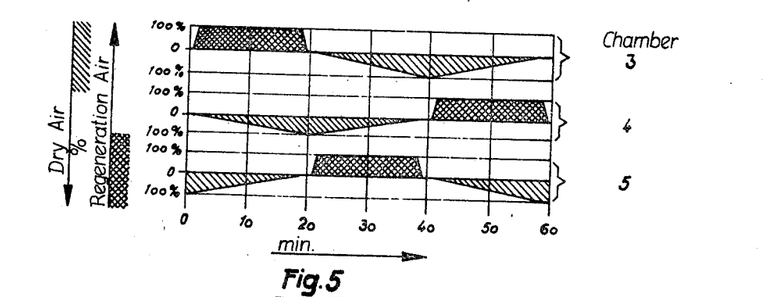
FIG. 5 is a graphical representation of the timing of admission of the treatment and regenerative medium for each of the adsorbent chambers of the apparatus of the type indicated in FIG. 4.

In FIG. 5 there is shown a cycle curve indicating the admission of the individual chambers 3', 4' and 5 by regenerating air and drying air, respectively, during a cycle. Instead of the rotary movement, it should be appreciated that a step-wise or linear movement may be possible, particularly when faster connection and disconnection of the chamber is desired. When more than two chambers are employed as indicated in FIG. 5, more than half of all the chambers, that is, all except one of the three chambers employed, are connected into the adsorption cycle, while the remaining, that is only one, is connected into the regenerating cycle. On the average, more than half the amount of adsorbent is used for adsorption while less than half is regenerated. This capacity increases not only proportional to the greater amount of adsorbent as would be the case with a linear increase of a two-chamber dryer, but with a three-chamber dryer two of the chambers are always connected in parallel in the drying air cycle while only one chamber is connected for regeneration. Thus, the time required for regeneration is greatly reduced and the time available for adsorption is utilized very economically. With a third chamber, therefore, the capacity increases 100%. This also holds true for a further increase in the number of chambers.

Figure 6:
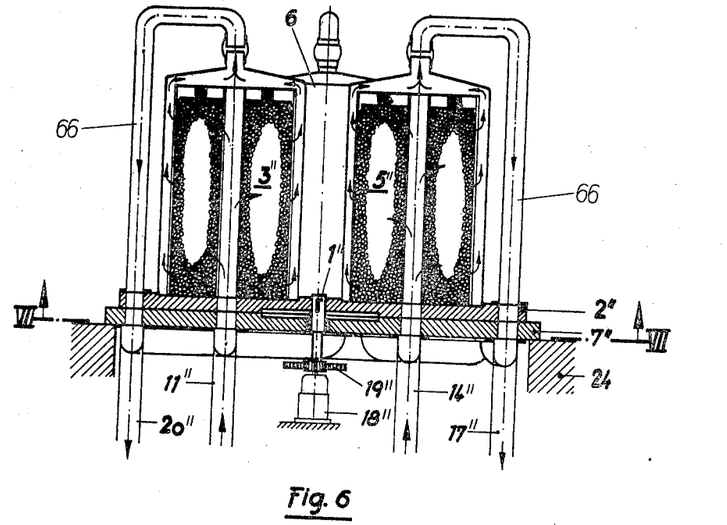
FIG. 6 is a view similar to FIG. 2 of another embodiment of the invention.
Figure 7:
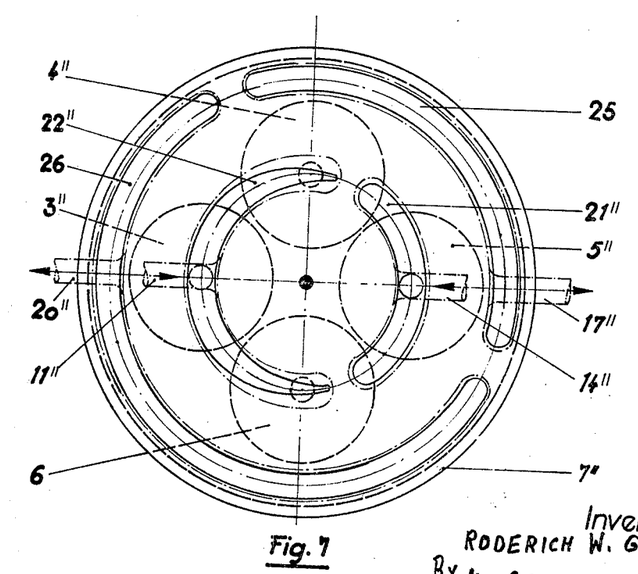
FIG. 7 is a section taken on the line 7—7 of FIG. 6.

In the embodiment indicated in FIGS. 6 and 7, a four-chamber arrangement is provided which includes chambers 3", 4", 5" and 6 which are all mounted on a plate 2" which is secured to a shaft 1" for rotation therewith so that the chambers together with the associated discharge conduit connections 66 are all rotatable. The disk 22 is mounted for rotation on a valve plate 7" which provides a means for effecting fixed connections to circulating means 11" and 20" for circulating the treatment fluid for admission cyclically to each chamber in succession and to circulating means 14" and 17" for circulating regenerative fluid for admission to the chambers during each cycle. Slots 21" and 22" provide means for the selective timed admission of the regenerative fluid and the fluid to be treated, respectively. The chambers 3", 4", 5" and 6 are gradually moved into alignment with the regenerative connection slot 21" and the treatment fluid connection slot 22" by a motor 18" driving through a transmission 19" as in the previous embodiment.

Figure 8:
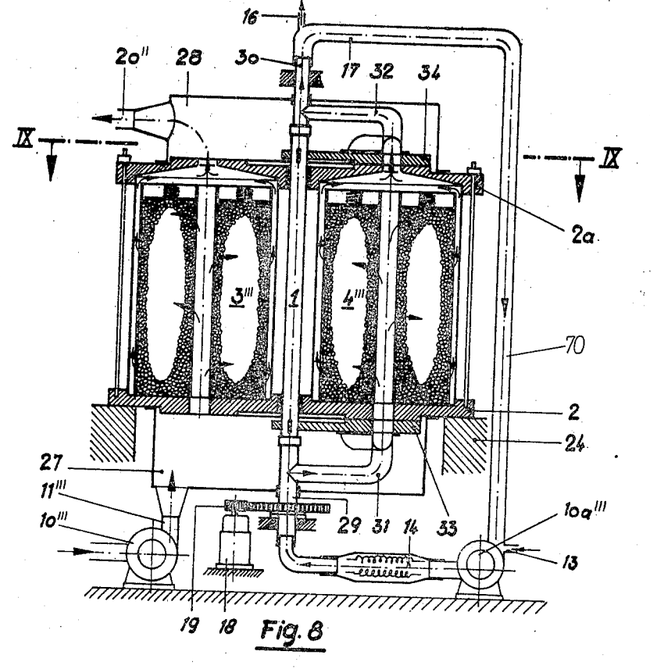
FIG. 8 is a view similar to FIG. 2 of still another embodiment of the invention.
Figure 9:
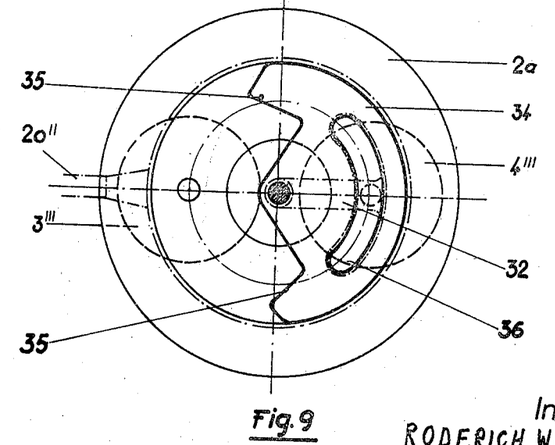
FIG. 9 is a section taken on the line 9—9 of FIG. 8.

In the arrangement indicated in FIGS. 8 and 9, the drying apparatus comprises rotary valve means for connecting chambers 3''' and 4''' to regenerative fluid circulating means generally designated 70. The regenerative fluid circulating means 70 includes a fan 10a''' arranged to discharge the regenerative fluid into a heater 14 for delivery upwardly through a hollow shaft member 1 forming a rotary valve together with distributing pipe 31 and a receiving pipe 32 which communicate with the aligned chamber through associated disk elements 33 and 34 which are rotated therewith. The disk elements 33 and 34 also close off the connection of the bottom and top of each chamber to an inlet casing 27 and a discharge casing 28, respectively, for the air to be treated. Whenever a disk 33 or 34 is not positioned over the associated open bottom or open top of the chambers 3''' and 4''' air will flow from the fan 10''' through the conduit 11''' and the inlet housing 27 into the uncovered chamber and be discharged out through the top into the chamber 28 and through an outlet conduit 20''.

As best indicated in FIG. 9, the disks 33 and 34 are shaped to provide the curved slot 36 of a length necessary for connecting each chamber 3''' and 4''' to the associated connection for the regenerative fluid. The slow inward admission and discharge of the fluid being treated is caused by the angled ends 35, 35 of the plate 34.

Figure 10:
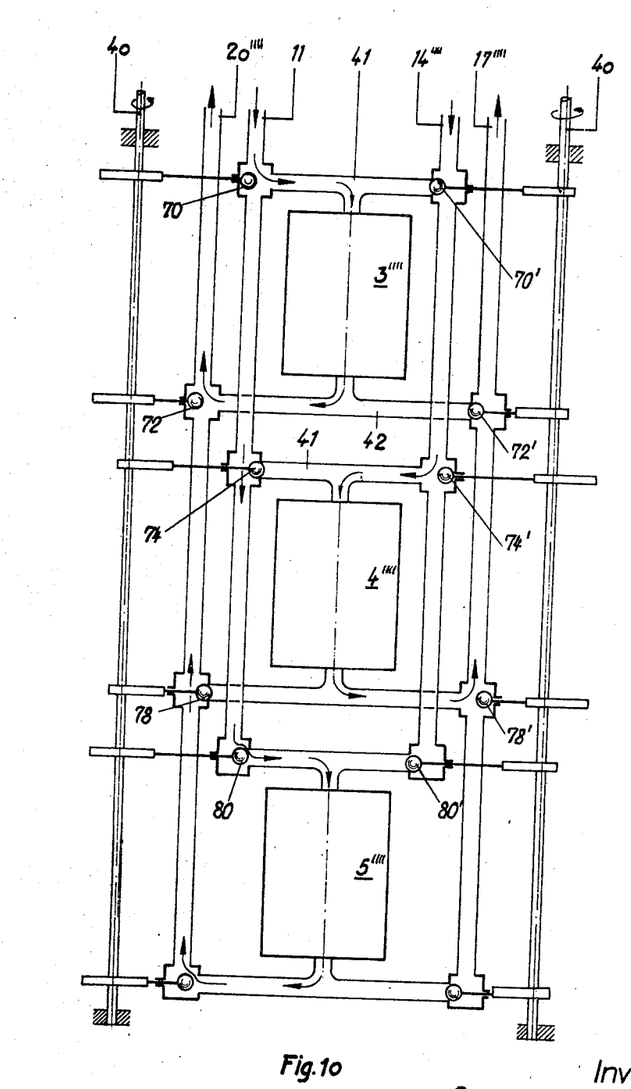
FIG. 10 is a schematic representation of a valve control for a three-chamber drier of a type indicated in FIG. 4.

As can be seen from FIG. 10, the invention is not limited to a flat slide valve for controlling the admission of the respective fluids but may comprise the valving arrangement indicated in FIG. 10 which is provided for each of the three vessels, 3'''', 4'''' and 5''''. The treatment air circulating means includes the conduit means 20'''' and the regenerative air circulating means includes the conduit means 14'''' and 17''''. The single cam shaft 40 (which has been indicated on the drawings as being double for clarity of illustration purposes) is rotatably mounted and is connected through crank arm portions to individual valve elements 70, 70', 72, 72', 74, 74', 76, 76', 78, 78' and 80, 80' which are associated with the conduits indicated so that treatment fluid and regenerative fluid may be selectively directed to and delivered away from each chamber during a portion of the operative cycle.

In some instances it is desirable to arrange a heat exchanger before each of the blowers for circulating both the drying air and the regenerative air in which heat is withdrawn from the returning humid drying air and fed to the regenerating air. The drying process can thus be carried out at optimum working temperature, the adsorbent may be optionally utilized and the heat balance improved.

While specific embodiments of the invention have been shown and described in detail to illustrate the applica-

What is claimed is:

1. A method for the selective adsorption of molecules from gases or liquids particularly of water vapor from gases preferably air, using chambers filled with adsorbent material, comprising directing, by a gradually changing flow rate, a medium to be treated through at least one of the adsorbent material chambers for contact of the medium with the adsorbent material; and, during the time of flow of the medium to be treated through the one chamber, admitting at least through one other chamber a regenerative medium for regenerating the adsorbent material in this chamber, and thereafter cyclically permitting flow of a regenerative medium through the chamber which has been subjected to the treatment medium and flow of the treatment medium through the chamber which has been subjected to the regenerative medium in a cyclical manner, of the medium to be treated being directed into each adsorbent material chamber at a flow rate which is increased slowly and so as to attain, at the latest, upon the completion of the half adsorption cycle, the rate of flow of the other of said chambers.

2. A method, according to claim 1, wherein the rate of flow is decreased slowly to zero after the maximum flow is attained.

3. A method, according to claim 1, wherein the medium to be treated is moved in a first closed circuit and the regenerative medium is moved in a second closed circuit and feeding fresh medium into said second closed circuit.

4. An apparatus for the selective adsorption of molecules from gases or liquids, particularly of water vapors from gases such as air, comprising a plurality of vessels defining drying chambers, treatment fluid circulating means including pipe lines for the passage of treatment fluid to and from said vessels, regenerative fluid circulating means including pipe lines for the passage of regenerative fluid to and from said vessels, said vessels being moveable relative to said regenerative fluid circulating means, a flat disk adjacent said vessels having a slot of gradually increasing dimension defined therein for communicating said treatment fluid movement means to said vessel and a separate slot of gradually decreasing dimension for communicating said regenerative fluid circulating means to said vessel at a variable upflow and inflow rate.

5. An apparatus according to claim 4, wherein said valve means comprises flat disks having a slot defined therein for communicating said treatment fluid movement means to said vessel and a separate slot for communicating said regenerative fluid circulating means to said vessel.

6. An apparatus according to claim 4, wherein said vessels are mounted in a fixed position, said valve means including a rotary delivery and discharge conduit element for the regenerative fluid, an inlet bonnet around one end of said vessels and a discharge bonnet around the opposite end of said vessels communicating with the interiors of said vessels and connected to the treatment fluid circulating means and disk elements rotatable at each end of said vessels together with and connected to said rotatable conduit element and having an arcuated slot each, each of said vessels having a small size opening at each end for communicating through the slot of said disk element with said conduit element for receiving regenerative fluid and, being uncovered by said disk element, for communicating with said bonnet for receiving the fluid to be treated.

7. An apparatus according to claim 6, wherein the trailing edges of said disk elements are provided with angle portions to provide for the gradual increase and decrease flow of treatment fluid from said bonnets into the communicating vessel.

8. An adsorption device, particularly a device for drying air, comprising a plurality of vessels defining adsorbent material chambers, treatment fluid circulating means adjacent said vessels, regenerative fluid circulating means adjacent said vessels, and valve means connected between said vessels and said treatment fluid circulating means and said regenerative fluid circulating means respectively for directing a treatment fluid through and receiving the discharge of the treatment fluid from at least one of said vessels while substantially simultaneously permitting flow of a regenerative fluid through and receiving the discharge of the regenerative fluid from at least one other of said vessels, wherein said valve means comprises a rotatable disk fixed to each end of said vessels having openings communicating with the interior of said vessels, said treatment and regenerative fluid circulating means including stationary inlet and outlet conduits positioned adjacent the inlet and outlet openings of said disks and a stationary plate disposed adjacent each disk and having at least two slots therein of gradually enlarging size, one of which provides means for communicating at least one of said vessels with said regenerative fluid circulating means and the other of said slots providing means for communicating at least one of said vessels with said treatment fluid circulating means.

9. An adsorption device according to claim 8, comprising a stationary plate having inlet and discharge arcuated slots connected, respectively, to said treatment fluid circulating means and to said regenerative fluid circulating means, said valve means including a rotatable disk member rotatable over said stationary plate, supporting said vessels and having openings for the inlet and for the discharge of fluid to and from said vessels cyclically connectable upon rotation of said disk member to said treatment fluid circuliating means and to said regenerative fluid circulating means through said slots.

10. An adsorption device, particularly a device for drying air, comprising a plurality of vessels defining adsorbent material chambers, treatment fluid circulating means adjacent said vessels, regenerative fluid circulating means adjacent said vessels, and valve means connected between said vessels and said treatment fluid circulating means and said regenerative fluid circulating means respectively for directing a treatment fluid through, and receiving the discharge of, the treatment fluid from at least one of said vessels while substantially simultaneously permitting flow of a regenerative fluid through, and receiving the discharge of, the regenerative fluid from at least one other of said vessels, said valve means comprising a rotatable disk fixed to each end of said vessels and having openings communicating with the respective interiors of said vessels, said treatment and regenerative fluid circulating means including stationary inlet and outlet conduits positioned adjacent the inlet and outlet openings of said fixed disks and a stationary plate disposed adjacent each disk and having at least two slots therein of gradually enlarging size, one of said slits being annular and providing means for communicating at least one of said vessels with said regenerative fluid circulating means and the other of said slots providing means for communicating at least one of said vessels with said treatment fluid circulating means, said treatment fluid circulating means and said regenerative fluid circulating means each including a fan having a suction for receiving fluid and a discharge for discharging fluid, said valve means also including a fixed plate having an arcuate slot defined therethrough for the flow of treatment fluid and an annular slot defined therethrough for the flow of regenerative fluid, a rotatable disk carried on said fixed plate, said plurality of vessels being mounted on said disk for rotation therewith and said vessels each having an opening aligned with an opening in said disk, means for rotating said disk with said vessels relative to said fixed plate to periodically communicate said openings with said slots for the passage of fluids for successively communicating said vessel with regenerative fluid and with treatment fluid.

11. An adsorption device according to claim 10, wherein said vessels each has an inlet opening at one end extending through said disk and a discharge opening at an opposite end, an additional disk having openings aligned with the respective discharge openings of said vessels and being fixed to said vessels for rotation therewith, a second stationary plate having a first slot for regenerative fluid and a second slot for treatment fluid both extending arcuately around the axis of rotation, said second slot being connected at its opposite side to a conduit for the discharge of the treatment fluid, said first slot being connected at its opposite side to a conduit for circulating said regenerative fluid back to said fan.

References Cited

UNITED STATES PATENTS

| | | | |
|---|---|---|---|
| 1,602,500 | 10/1926 | Nuss | 55—181 |
| 2,507,607 | 5/1950 | Miller | 55—390 |
| 2,639,000 | 5/1953 | Edwards | 55—390 |
| 2,739,670 | 3/1956 | Miller | 55—34 |
| 3,252,273 | 5/1966 | Stephens | 55—390 |
| 3,306,006 | 2/1967 | Urban | 55—33 |

REUBEN FRIEDMAN, Primary Examiner

C. N. HART, Assistant Examiner

U.S. Cl. X.R.

55—179